N. D. M. YORKE.
LINEAR MEASURE FOR ROPES, &c.
APPLICATION FILED MAY 1, 1911.

1,022,916.

Patented Apr. 9, 1912
3 SHEETS—SHEET 1.

Witnesses:
P. F. Nagle.
L. Douville.

Inventor:
Norman Dewar Macgregor Yorke,
By Willisheny Faubanc.
Attorneys.

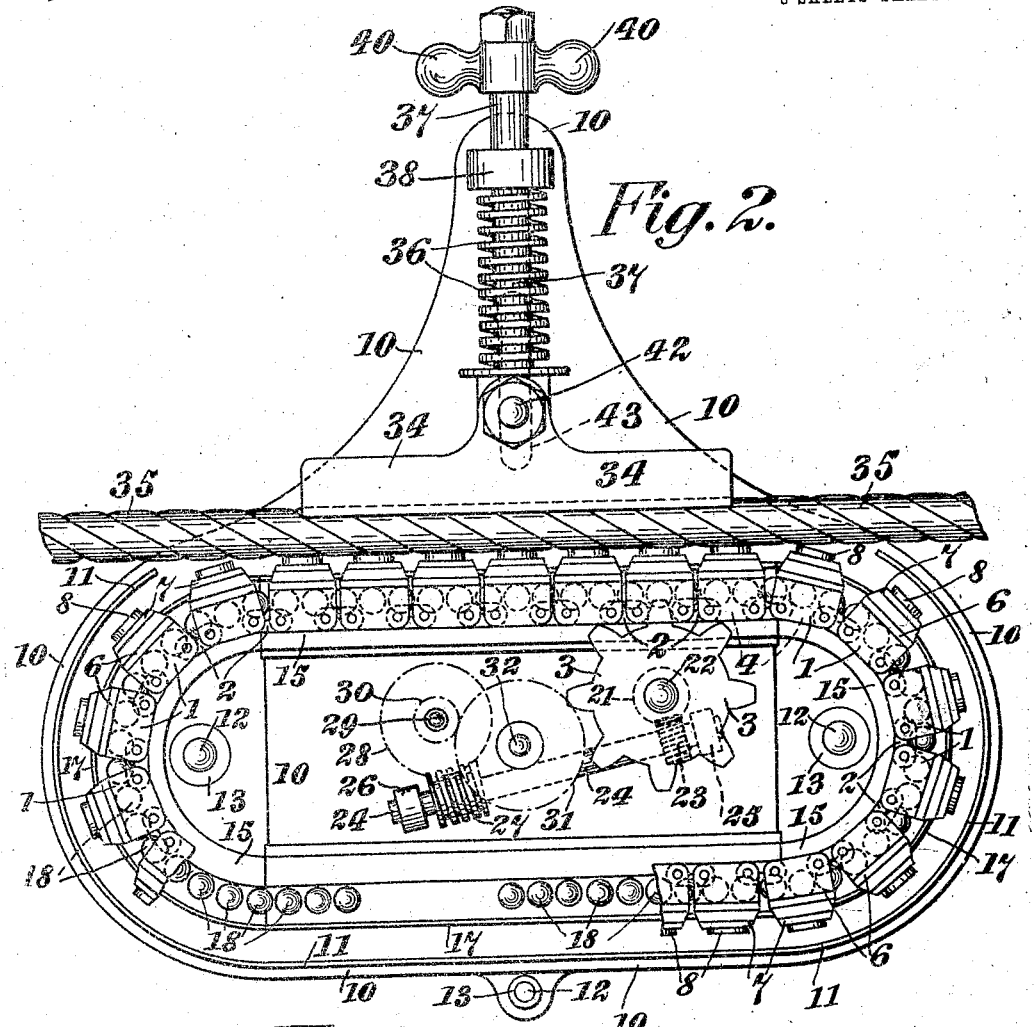
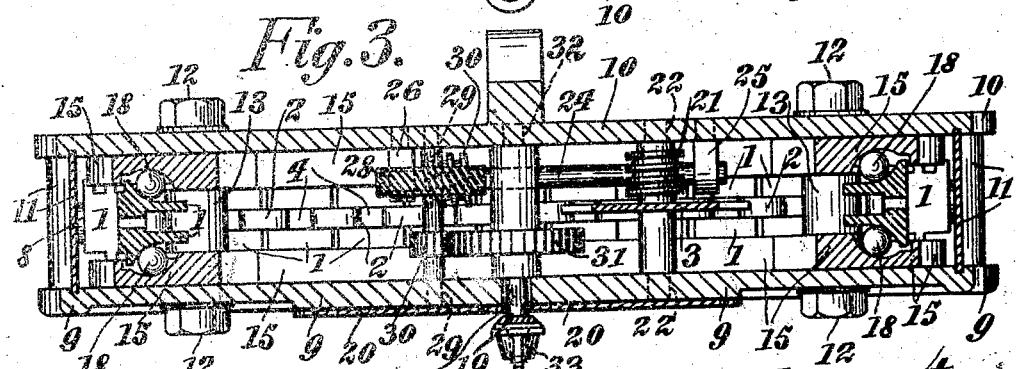

N. D. M. YORKE.
LINEAR MEASURE FOR ROPES, &c.
APPLICATION FILED MAY 1, 1911.

1,022,916.

Patented Apr. 9, 1912.

3 SHEETS—SHEET 3.

UNITED STATES PATENT OFFICE.

NORMAN DEWAR MACGREGOR YORKE, OF GLASGOW, SCOTLAND.

LINEAR MEASURE FOR ROPES, &c.

1,022,916.   Specification of Letters Patent.   Patented Apr. 9, 1912.

Application filed May 1, 1911. Serial No. 624,302.

*To all whom it may concern:*

Be it known that I, NORMAN DEWAR MACGREGOR YORKE, a subject of the King of Great Britain, residing at Glasgow, Scotland, have invented a certain new and useful Linear Measure for Ropes, &c., of which the following is a specification.

This invention relates to a linear measure or device for measuring and indicating the continuous length of ropes, cords, wires, tapes, rods and other material.

In devices as at present generally in use for measuring the continuous length of cords, ropes and the like, the material being measured passes around a sheaf or drum whose rotary motion is imparted through suitable gear to an indicator, and such linear measures have the disadvantages that the rope or the like is very liable to slip on the surface of the drum and the length shown on the indicator of the device is true only for one diameter of rope or the like.

The object of the present invention is to provide a linear measure which accurately indicates the length of ropes, cords and the like of varying diameters or thicknesses and which can also be used for measuring rods, bars, rails or the like.

Under my invention the device is fitted with an endless traveling band which is so arranged that a portion thereof lies in a straight line and so presents a flat traveling plane against which the rope or other material being measured is pressed, and, driven from this endless band, is a suitable gear from which an indicator is operated, the motion of the rope or other material being thus transmitted to the endless band and the motion of the band being transmitted to the indicator.

In order that my invention may be clearly understood I have hereunto appended explanatory drawings, wherein:—

Figure 1:
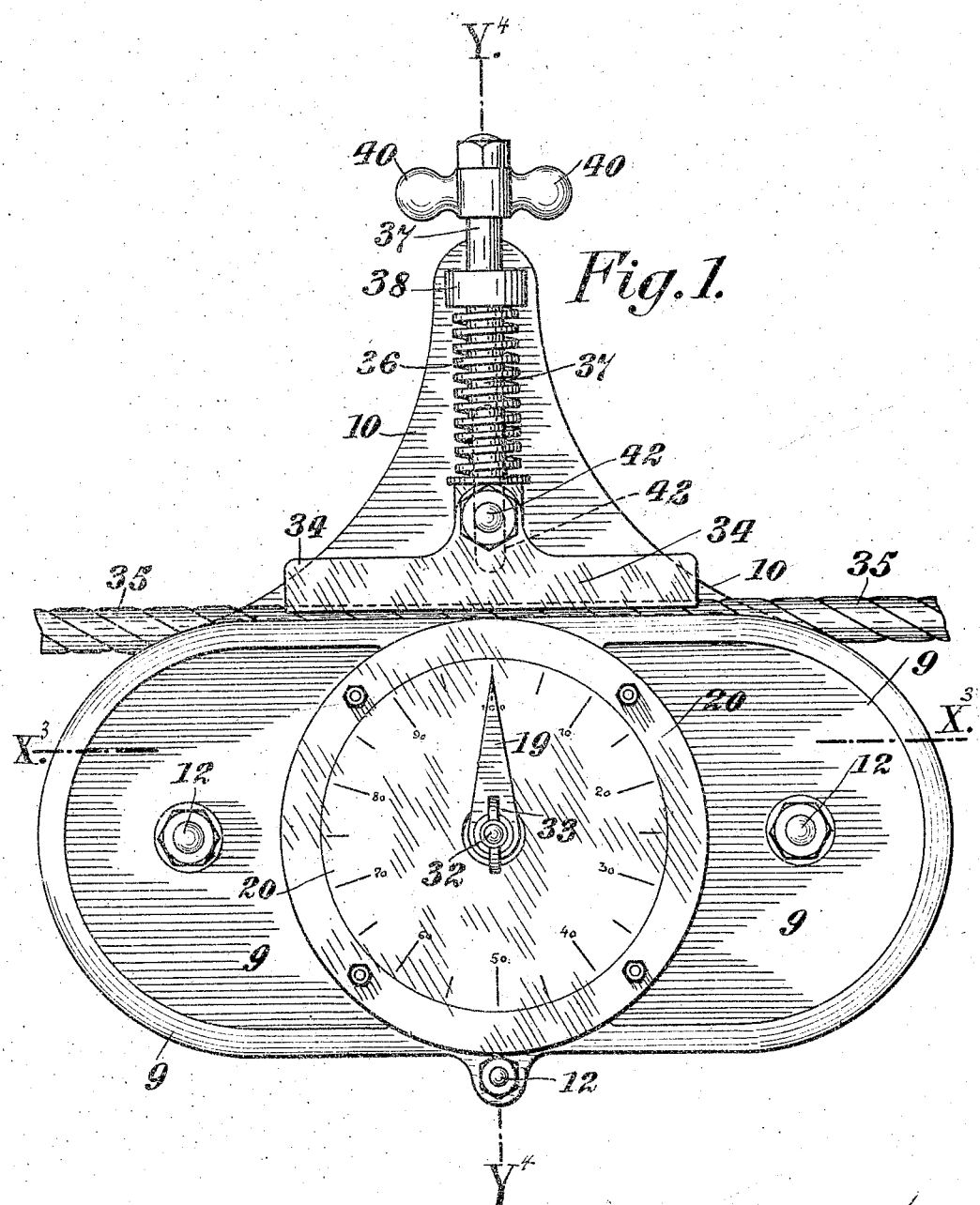
Figure 4:
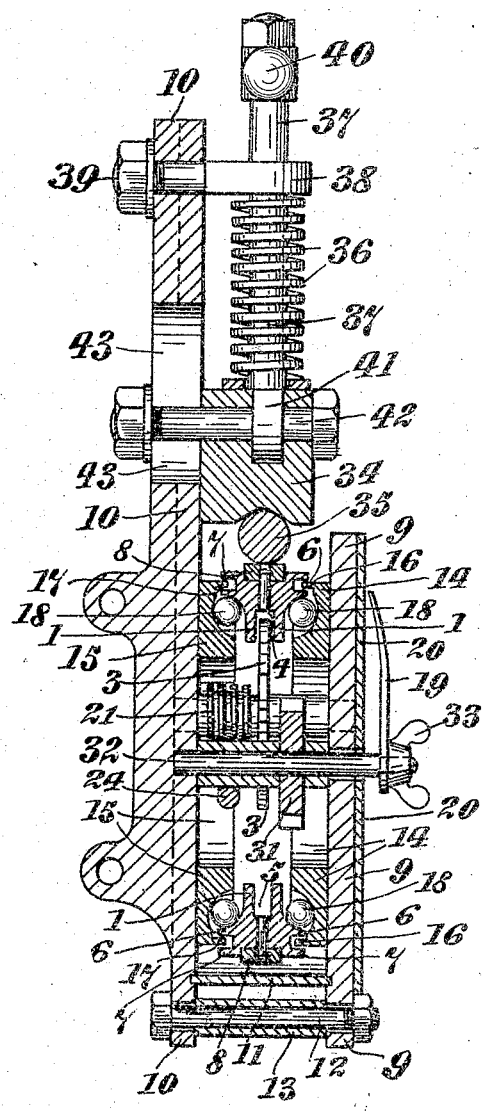

Figure 1 is a front elevation of the measuring device and Fig. 2 shows the same with the front plate removed. Fig. 3 is a section taken on the line $X^3$—$X^3$, of Fig. 1 and Fig. 4 a section taken on line $Y^4$—$Y^4$, of Fig. 1.

The endless band preferably consists of a series of links 1 which are movably connected together by means of joint links 2 in such manner that the teeth of a sprocket wheel or pinion 3 extend into spaces 4 left between the joint links 2 and thus allow the endless band to move in one or the other direction and rotate the sprocket wheel or pinion 3. The links 1 are provided at their ends with recesses 5 wherein the one end of the joint link 2 is secured while the other end of the link 2 is fixed to the next link 1 and so on, thus all the links 1 are joined together so as to form an endless band. Each side of the link 1 is provided with two projections 6, 7, and secured to or fitted in the top of the link is a plate or pad 8. In some cases, if desired, the plate or pad 8 may be dispensed with and a suitable groove or recess may be formed in the top of the link in lieu of the plate or pad.

The endless band is inclosed in a suitable casing preferably consisting of a removable front plate 9, back plate 10 and side plates 11. The removable front plate 9, is held in position by means of screw bolts 12 or the like which pass through distance pieces 13 whereby the front plate 9 and the back plate 10 are kept at a suitable distance apart. The side plates 11 rest in suitable checks or recesses provided in the front and back plates and are constructed so as to leave a gap or recess at the top through which the plates or pads 8 or the tops of the links 1 extend or project.

Secured to each inner face of the front and back plates 9, 10, are races 14 and 15 respectively, which are provided with projections 16, 17, extending into the recesses left between the projections 6, 7, of the links 1 and forming a dust excluding device while allowing the endless band to rotate freely between the front and back plates 9, 10. To facilitate and insure the smooth and easy running of the endless band, balls 18 are provided which are placed in ball bearings formed in any suitable manner by the links 1 and the races 14, 15.

The pointer 19 which indicates the length of the material measured on a suitably graduated plate 20 fixed to the outer face of the removable front plate 9, is operated from the endless band by intermediate gear, preferably consisting of the sprocket wheel 3, which engages between the link joints 2 and is rotated by the motion of the endless band, and a worm 21 secured to the sprocket wheel shaft 22. Meshing with the said worm 21 is a worm wheel 23 which is keyed to a shaft 24, rotatably fitted in bearings 25, 26. Also secured to this shaft 24 is a worm 27 which engages with a worm wheel 28, the latter being keyed to a shaft 29 to which is secured a pinion wheel 30 meshing with a pinion wheel 31, which latter is fitted to a shaft 32 passing through the indicator plate 20. The pointer 19 of the indicator is secured to the outer extremity of the shaft 32 by means of a butterfly nut 33 or other suitable means. As will be seen from the foregoing, the pointer 19 is rotated at the proper speed through the medium of the endless band and it indicates on the graduated plate 20 the length of the material measured.

Located in the device is a movable plate or pad 34 (with or without bearing rollers) which bears against the rope or other material 35 and presses same against the plates or pads 8 or the grooved or recessed tops of the links 1 of the endless band. This pressure is produced by means of a spring or pressure device 36 which is fitted on a spindle 37 passing through a bracket 38 which is secured to the back plate 10 by means of a screw 39 or its equivalent. A handle 40 is fitted to one end of the spindle 37, while the other end is provided with an extension 41 fitted in a recess in the plate or pad 34. A screw bolt 42 passes through the plate or pad 34 and the extension 41 of the rod 37 and thereby movably secures the latter to the plate or pad 34. This screw bolt 42 extends through a slot or opening 43 in the back plate 10, so as to allow of the plate or pad 34 being moved or operated by means of the handle 40, against the action of the spring 36, for the purpose of introducing or removing the rope 35, or other material being measured. When the handle 40 is in its working position the plate or pad 34 is pressed against the rope 35 or other material and the latter is thereby pressed against the movable endless band so that, as the rope 35 or other material is pulled forward, the endless band is rotated thereby rotating the sprocket wheel 3 and worm and worm wheel gearing 21, 23, 27, 28, and consequently also the pointer 19 on the shaft 32 thus indicating on the graduated plate 20 the length of the material measured.

Having now fully described my invention, what I claim and desire to secure by Letters Patent is:—

1. A device for measuring the length of an article (such as a rope, cord, rod, wire or tape) comprising an endless traveling band, an endless bearing race, having a straight unyielding portion therein, for the inner surface of the band, means for pressing the article being measured against the outer surface of the band which band is supported, and held in a straight line, by the said straight surface, and indicator mechanism automatically operated from the traveling band.

2. A device for measuring the length of an article (such as a rope, cord, rod, wire or tape) comprising an outer casing made in parts, an endless traveling band, an endless bearing race between the parts of the casing and having a straight unyielding portion therein, for the inner surface of the band, means for pressing the article being measured against the outer surface of the band which band is supported, and held in a straight line, by the said straight surface, and indicator mechanism automatically operated from the traveling band.

3. A device for measuring the length of an article (such as a rope, cord, rod, wire or tape,) comprising an outer casing made in parts, an endless traveling band working in the casing, adjustable means comprising a handle, a spindle fitted in brackets in the casing, a pressure plate secured to the spindle and a spring fitted on the spindle and bearing on the plate, for pressing the article being measured against the traveling band, and indicator mechanism automatically operated from the traveling band.

4. A device for measuring the length of an article (such as a rope, cord, rod, wire or tape) comprising an outer casing made in parts, an endless traveling band working in the casing, ball bearing means for the endless band, adjustable means comprising a handle, a spindle fitted in brackets in the casing, a pressure plate secured to the spindle, and a spring fitted on the spindle and bearing on the plate, for pressing the article being measured against the traveling band, and indicator mechanism automatically operated from the traveling band.

In testimony whereof I affix my signature in presence of two witnesses.

NORMAN DEWAR MACGREGOR YORKE.

Witnesses:
WILLIAM FLEMING,
WILLIAM CARRUTHERS.